United States Patent [19]

Collins et al.

[11] 3,851,096

[45] Nov. 26, 1974

[54] SURVEILLANCE SYSTEM

[75] Inventors: Dean R. Collins; Jerry D. Holmes, both of Dallas, Tex.

[73] Assignee: Texas Instruments Incorporated, Dallas, Tex.

[22] Filed: Nov. 3, 1972

[21] Appl. No.: 303,441

[52] U.S. Cl......... 178/6.8, 178/DIG. 3, 178/DIG. 33
[51] Int. Cl......... H04n 3/14, H04n 7/12, H04n 7/18
[58] Field of Search............... 178/7.1, 6.8, DIG. 33, 178/DIG. 3; 340/173 C; 307/221 C

[56] References Cited

UNITED STATES PATENTS

| | | | |
|---|---|---|---|
| 2,951,899 | 9/1960 | Day | 178/DIG. 3 |
| 3,507,992 | 4/1970 | Foote | 178/DIG. 33 |
| 3,643,106 | 2/1972 | Berwin | 307/221 C |

OTHER PUBLICATIONS

Altman, "The New Concept For Memory and Imaging: Charge Coupling" Electronics, June 21, 1971, pp. 50–59.

*Primary Examiner*—Howard W. Britton
*Attorney, Agent, or Firm*—Harold Levine; James T. Comfort; Richard L. Donaldson

[57] ABSTRACT

A charge transfer device moving target indicator system is disclosed. The system includes a photosensitive imager and an analog delay line for storing one frame of video information generated by the imager. Signal processing circuitry compares corresponding elements of the imager and delay line to detect variations between successive frames of video information.

11 Claims, 10 Drawing Figures

PATENTED NOV 26 1974

3,851,096

SHEET 5 OF 5

SURVEILLANCE SYSTEM

The present invention pertains to optical surveillance systems in general, and more particularly to such a system which includes a charge-transfer device photosensitive imager and an optically inactive charge transfer device analog delay line, with signal processing circuitry for detecting variations in a monitored scene.

Numerous situations are presented in data processing applications where it is necessary to compare data at a first point in time with subsequently generated data. One important application for such a technique is termed "delta modulation," wherein the bandwidth requirements for transmitting a signal corresponding to a target is reduced by transmitting only data which changes between successive frames. By way of example, delta modulation is effective in a televised scene where a significant portion of the scene remains the same from one frame to the next frame. Initially, signals defining the entire scene are obtained and are stored in a transmitting memory. The signals are also transmitted to a receiving station, and are there stored in a memory from which non-destructive read-out may be provided for display. Subsequently, the target is periodically scanned, generating new video signals. These signals are compared with the signals generated in the previous scan or frame (which are stored in the transmitting memory) and only data which is changed is transmitted to the receiving station. This change, i.e., "delta" data is stored in the corresponding elements in the memory at the receiving station and then the entire memory can be read-out, including the previously stored data and the "delta" data to provide the required video signals for display. This delta modulation technique substantially reduces the amount of data required to be transmitted when a relatively static scene is being monitored.

Another important application of such a data comparison technique relates to unmanned surveillance systems for general security applications wherein movement in a monitored scene may connote a security breach. To date, however, such systems have been generally costly, exhibit insufficient resolution, and are not easily adjustable to different ambient or changing ambient environments.

Accordingly, an object of the present invention is an improved system for periodically scanning a target with a photosensitive imager and detecting a change in the target between successive scans.

A further object of the invention is an inexpensive, high resolution optical surveillance system for detecting variations in a target.

Yet another object of the invention is the provision of a delta modulation system for transmitting only that data of a monitored scene which corresponds to optical variations between subsequent scans or frames.

Another object of the invention is an optical surveillance system which includes an optically active charge-transfer device imager and an optically inactive charge transfer device analog delay line for enabling comparison of successive frames to detect optical variations therebetween.

A further object of the invention is the provision of a surveillance system effective to transmit optical signals defining a monitored scene responsive to detection of variation in any part of the monitored scene.

Briefly, in accordance with the invention, a system is provided for detecting a change in the status of data corresponding to a preselected monitored target. The system includes means for projecting a first image of the target on an array of charge transfer device resolution elements. Each of the resolution elements is effective to generate an analog signal corresponding to the image thereon. Means are included for providing a serial read-out of the signals generated by the respective resolution elements. Storage means are provided for receiving the analog signals. The array is then exposed to a second image of the target. Clocking means are effective to read-out data from the array corresponding to the second image and to also read-out corresponding data generated from the first image from the storage means. Signal processing circuitry receives data from both the array and the storage means and provides an output signal whenever the difference in signal level exceeds a preselected threshold.

In a preferred embodiment the array comprises a serial-parallel-serial configuration of optically active charge-coupled devices and the storage means comprises a serial-parallel-serial configuration of optically inactive charge-coupled devices.

A delta modulation data transmission system in accordance with the invention includes a detector having a plurality of resolution elements for periodically scanning a selected target and providing electronic signals corresponding thereto. Transmission means selectively transmit the signals to a receiving station where first storage means store the signals. A display is connected to the first storage means for displaying the image corresponding to the signals. Second storage means are connected between the detector and the transmission means for storing signals corresponding to one scan of the target. Signal processing circuitry compares the electronic signals provided by the detector during a scan subsequent to the first scan with signals stored in the second storage means to provide output signals only when a difference in data is indicated. The output signals are then coupled to the transmission means for transmission to the first storage means. Thus, only difference data is required to be transmitted.

In a more specific embodiment of the invention a moving target indicator system is provided. The system includes means for periodically scanning a target with an optically active charge transfer device array having a plurality of resolution elements for respectively generating signals during each scan. An optically inactive storage means receives the signals. Clocking means transfer the signal from the array to the storage means, enabling the array to generate signals corresponding to a second scan of the target. Comparator means are connected to the array and the storage means for comparing the signals corresponding to the first and second scans.

Other objects and advantages of the invention will be apparent upon reading the following detailed description of illustrative embodiments in conjunction with the drawings wherein:

FIG. 1 is a diagrammatical illustration of a data comparator system in accordance with the invention;

FIG. 2*a* is a schematic of a suitable difference network for the system illustrated in FIG. 1;

FIG. 2*b* is an illustrative summing network which can be used in the system depicted in FIG. 1;

In accordance with the present invention, a surveillance system includes a charge-transfer device imager and a charge-transfer device analog delay line. Charge transfer devices include bucket brigade configurations of insulated gate field effect transistors (BB) and semiconductor charge-coupled devices (CCD).

A brief description of phenomena associated with charge transfer devices will facilitate understanding of the present invention. One factor of importance for consideration in charge transfer device analog delay lines and imagers is the charge transfer efficiency. Basically, the charge transfer efficiency determines the number of transfers, that is, the total length of the transfer chain for an analog data system. When the information is being transferred a portion of the charge is lost. By way of example, it is reported by Bertrim, "Application of the Charge Coupled Device Concept to Solid State Image Sensors" paper 5C.1, IEEE INTERNATIONAL CONVENTION, March 22–25, N.Y. (71C8-IEEE) that a bucket-brigade operating at 5 MHz has a transfer efficiency of approximately 99.7 percent while charge-coupled devices operated at about 2 MHz have a 99.9 percent charge transfer efficiency and that at 6.5 MHz they operate with greater than 99.9 percent charge transfer efficiency.

Generally, the charge transfer efficiency increases as the clock frequency decreases and thus lower clock frequencies increase the charge transfer efficiency. However, at low frequencies the phenomenon of storage time limits operation. That is, in bucket-brigades the source and drain leakage current discharges the bucket potential while in charge-coupled devices the bulk diffusion or the surface state generation current fills the "potential well." The maximum time during which charge can remain in a potential well or at a bucket without degradation is generally referred to as the storage time.

Figure 1:
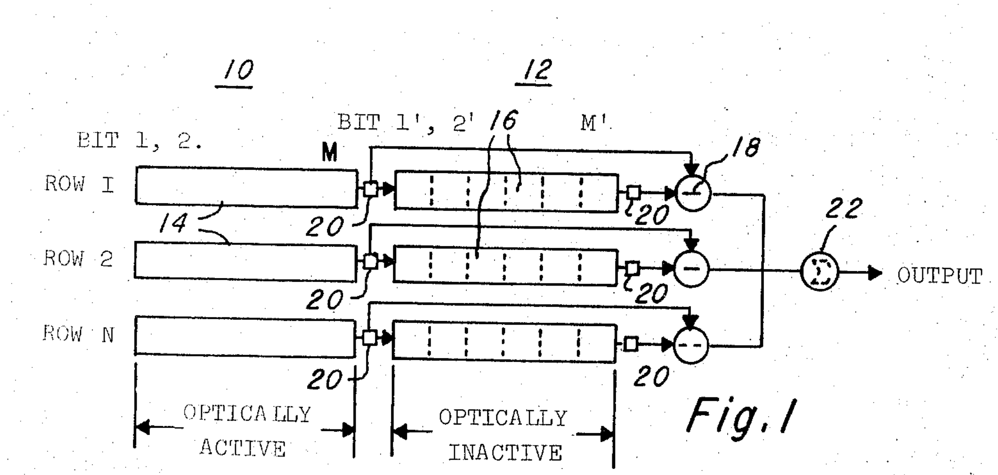

With reference now to FIG. 1, a surveillance system includes an optically active charge transfer device imager, shown generally at 10 and an optically inactive charge transfer device analog delay line or memory 12. Preferably the imager 10 and delay line 12 comprise charge-coupled devices (CCD).

One major advantage of a CCD imager over conventional vacuum tube cameras such as the silicon-diode vidicon is ease of manufacture. A CCD imager requires no diffusions in the silicon to form sensor elements, as compared to the diode vidicon which requires several hundred thousand diffused diodes. Furthermore, the diode vidicon is a high-voltage, high-power, magnetic-field electron-beam-scanned vauum tube whereas the CCD is a small, low-voltage, low-power, vacuum device fabricated with a standard semiconductor technology and is driven by small, low-cost scanning circuits. Most important, video information from a resolution element of the CCD can be stored in a CCD analog delay line for subsequent comparison of an element of one frame with the corresponding element of the next frame.

In the embodiment illustrated in FIG. 1, the imager 10 comprises a plurality of rows 14, each row defining M bits or resolution elements. Responsive to exposure of the array 10 to an image, the respective resolution elements generate an analog signal corresponding to the light intensity of the image corresponding thereto. The rows are then serially read out in parallel in shift register fashion. The data generated by each row 14 is stored in a corresponding optically inactive analog delay line 16. Considering for the moment Row 1 of the imager 10, and resolution element M, responsive to a first exposure of the imager to a target, element M generates an analog signal. After a preselected integration time the data is shifted from the imager 10 and stored in row 1 of the analog delay line. The signal generated in resolution element M is stored in a corresponding location M' of the analog delay line. Thus, it may be seen that one frame of video signals can be stored in the delay line 12. The imager is again exposed to the target and resolution element M generates a new analog signal. A clock system (not shown), shifts the data from imager 10 and also shifts the data from the analog delay line 12. When the bit of data defining the signal generated by resolution element M is shifted from the imager, the bit of data stored at location M' in the analog delay line, corresponding to the value of the signal generated by resolution element M during the preceding frame of video information, is shifted from the delay line, sampled by a high impedance tap 20 and applied as an input to a difference network 18. A high impedance tap diagrammatically illustrated at 20, at the output of the imager 10, samples the value of each bit as it is shifted out, and applies this signal to the difference network or comparator 18. In this manner, successive frames of data are compared. The signals from the difference networks 18 are applied to a summing network 22 from which an output is taken responsive to a difference which exceeds a selected threshold. In this configuration differences are compared on a column by column basis.

With reference to FIGS. 2a–2f, illustrative circuits for effecting the high impedance tap 20, the difference network 18 and the summing network 22, are depicted.

Figure 2A:
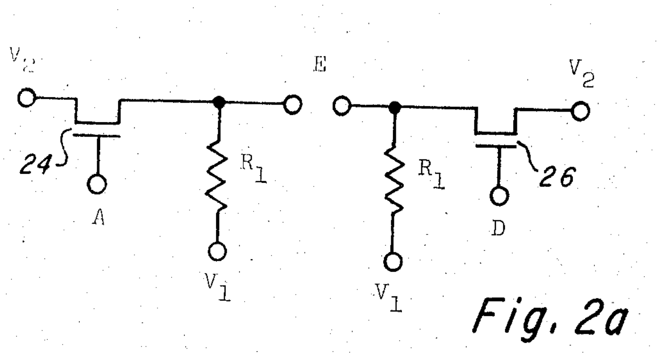
FIG. 2c illustrates a summing network similar to FIG. 2b but which incorporates a grounded base bipolar transistor.
FIG. 2d is a plan view illustrating a high impedance tap suitable for use in FIG. 1.
FIG. 2e is a cross-section view along the line A—A of FIG. 2d.
FIG. 2f is a cross-section view illustrating an alternative high impedance tap configuration.

In FIG. 2a a suitable high impedance tap and a suitable difference network is shown. The output A from each row 14 of the optically active imager is coupled to the gate electrode of suitably biased high impedance field effect transistor 24. Similarly, the output D from each row 16 of the analog delay line 12 is coupled to the gate electrode of a suitably biased field effect transistor 26. A voltage E is generated whenever a difference exists between signals A and D. As understood by those skilled in the art, the magnitude of E and the signal difference required to generate E can be controlled by the biasing levels and geometry of transistors 24 and 26.

Figure 2B:
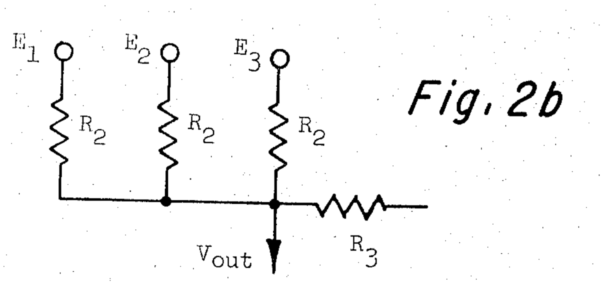
Figure 2C:
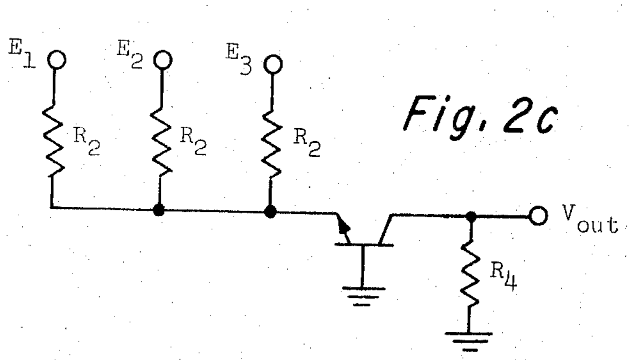

With respect to FIG. 2b a circuit exemplary of a summing network 22 is illustrated. In the circuit of FIG. 2b summing is accomplished by adding the currents in a resistor $R_3$ where $R_3 << R_2$. As shown in FIG. 2c, in a practical sense the resistor $R_3$ may advantageously comprise a grounded base bipolar transistor. The voltages $E_1$, $E_2$, and $E_3$, of course, are those generated by the difference networks 18.

Figure 2D:
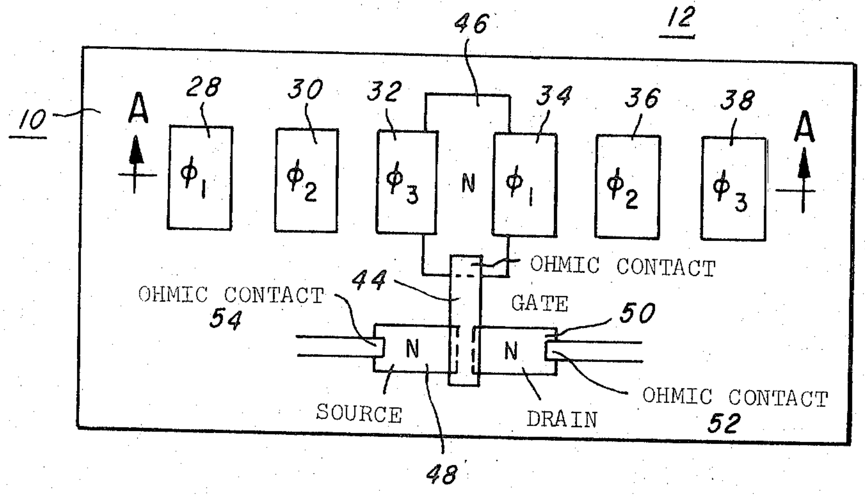
Figure 2F:
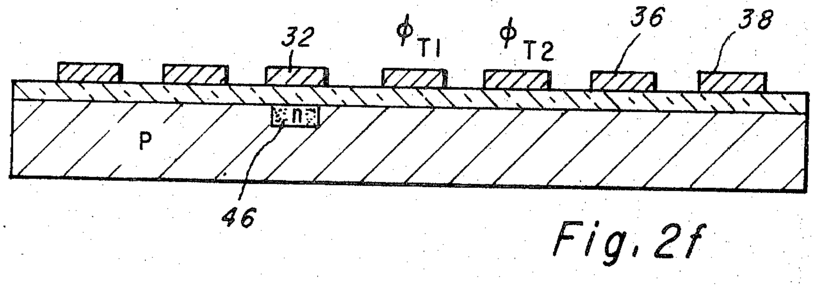
Figure 2E:
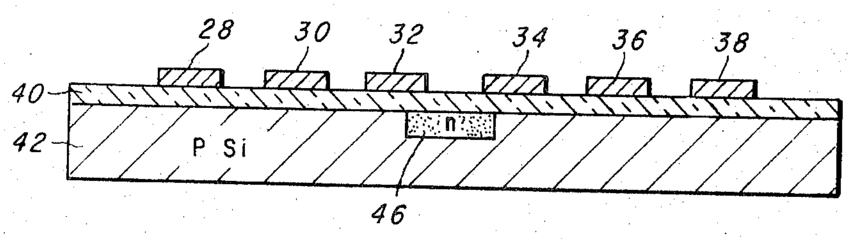

With reference now to FIGS. 2d and 2e, a suitable structure for effecting high impedance tap 20 to the output of the imager 10 and analog delay line 12 is shown. For clarity of illustration, only the last bit of a three phase optically active CCD imager and the first bit of a three phase optically inactive CCD analog delay line are illustrated. As understood by those familiar with operation of a three phase CCD shift register, three electrodes 28, 30, and 32 for receiving clocks $\phi_1$, $\phi_2$, and $\phi_3$ define one bit or resolution element of an imager, while three optically inactive electrodes 34, 36 and 38 are effective to define one bit of an analog delay line. The electrodes 28–38 are defined on a relatively thin insulating layer 40, such as silicon dioxide, which separates the electrodes from a semiconductor substrate 42, such as p-type silicon. Although a three phase CCD is shown for illustration, this concept applies equally for two, four, and other polyphase CCD's.

The high impedance tap comprises a gate electrode of an insulated gate field effect transistor. The gate electrode 44 is ohmically connected to a region 46 of said substrate which is doped to be of opposite conductivity type as the bulk of the substrate. As shown, the region 46 is n-type and the substrate is p-type. These conductivity types could of course be reversed.

The region 46 is defined to underlie the substrate region between electrodes 32 and 34. Accordingly, responsive to a signal being transferred from the imager 10 to the delay line 12, the potential of the region 46, and correspondingly, the potential of the gate electrode 44, varies responsive to the magnitude of the transferred bit. The gate electrode 44 overlies, in transistor forming relationship, spaced apart source and drain regions 48 and 50 which are n-type regions formed in the surface of the p-type substrate 42. Ohmic contacts 52 and 54 enable biasing the transistor and applying a signal to the difference network 18.

FIG. 2f illustrates an alternative high impedance tap where the region 46 is formed to underlie an electrode 32 of the imager 10. In this configuration one or two transfer electrodes $\phi T1$ and $\phi T2$ may be required in order to remove all of the charge from the doped region 46 and reset its potential to a desired value.

Figure 3:
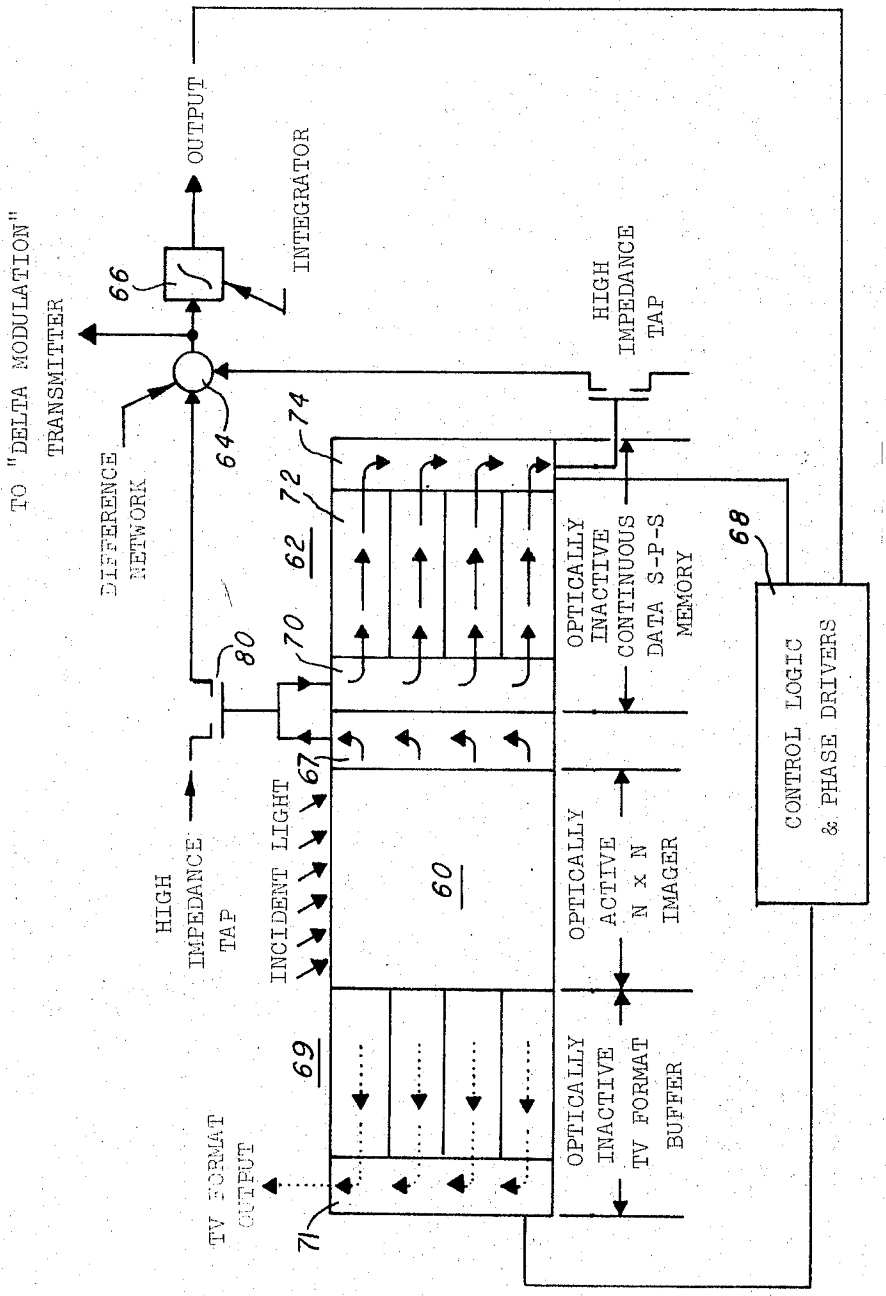
FIG. 3 is a block diagram illustration of a surveillance system in accordance with the invention using separate serial-parallel-serial CCD configurations for the imager and memory.

With reference now to FIG. 3, a preferred embodiment of the invention is shown. In this embodiment, three serial-parallel-serial (SPS) shift registers 60, 62 and 68 are advantageously utilized, the first defining a photosensitive area imager for receiving optical information relative to the monitored scene, and the second defining an analog delay line or memory to store one frame of video information relayed by the first SPS device and the third being used to send a scene in TV format. Signal processing circuitry comprising a comparator 64 and an integrator 66 compares each corresponding element of the two registers 60 and 62 and detects variations in the monitored scene that exceed some predetermined threshold level. In this configuration, scene differences are compared on a resolution element by resolution element basis.

Control logic and phase driver circuitry 68 are effective to synchronize operation of the shift registers 60 and 62. An optically inactive TV format buffer 69 provides video display compatible signals responsive to the output from the integrator 66 signaling movement or change in the monitored scene. This finds advantageous utilization, e.g., in general security application where several locations are monitored and a visual monitor in a control room is activated only responsive to indicia suggesting a breach of security, at which time a TV picture of the location in question would be transmitted to the control room for display. Another advantageous utilization for the configuration illustrated is delta modulation where only difference data, as detected by the signal processing circuitry 64, is transmitted to a remote receiving station, thereby enabling bandwidth compression.

In operation, the signal at the output of the optically active imager 60 is detected by the high impedance tap 80 for comparison with the previous frame and is also inserted in the optically inactive S-P-S memory 62. This optically inactive memory is substantially identical to the imager 60 and is utilized as an analog delay line capable of storing one frame of video information. The two arrays 60 and 62 are clocked at the same rate so that their outputs at any given time will be video information about one particular resolution element of the image at two different times separated by an interval of one frame period. Comparing these two outputs for one frame cycle results in a comparison of one frame with the previous frame enabling detection of moving objects. The basic function of the processing circuitry comprising the comparator 64 and integrator 66, is to detect motion in the scene and either enable the control logic and phase drive circuits 68 to transmit TV format output data for display or to transmit the delta modulation signal at 64.

Figure 4:
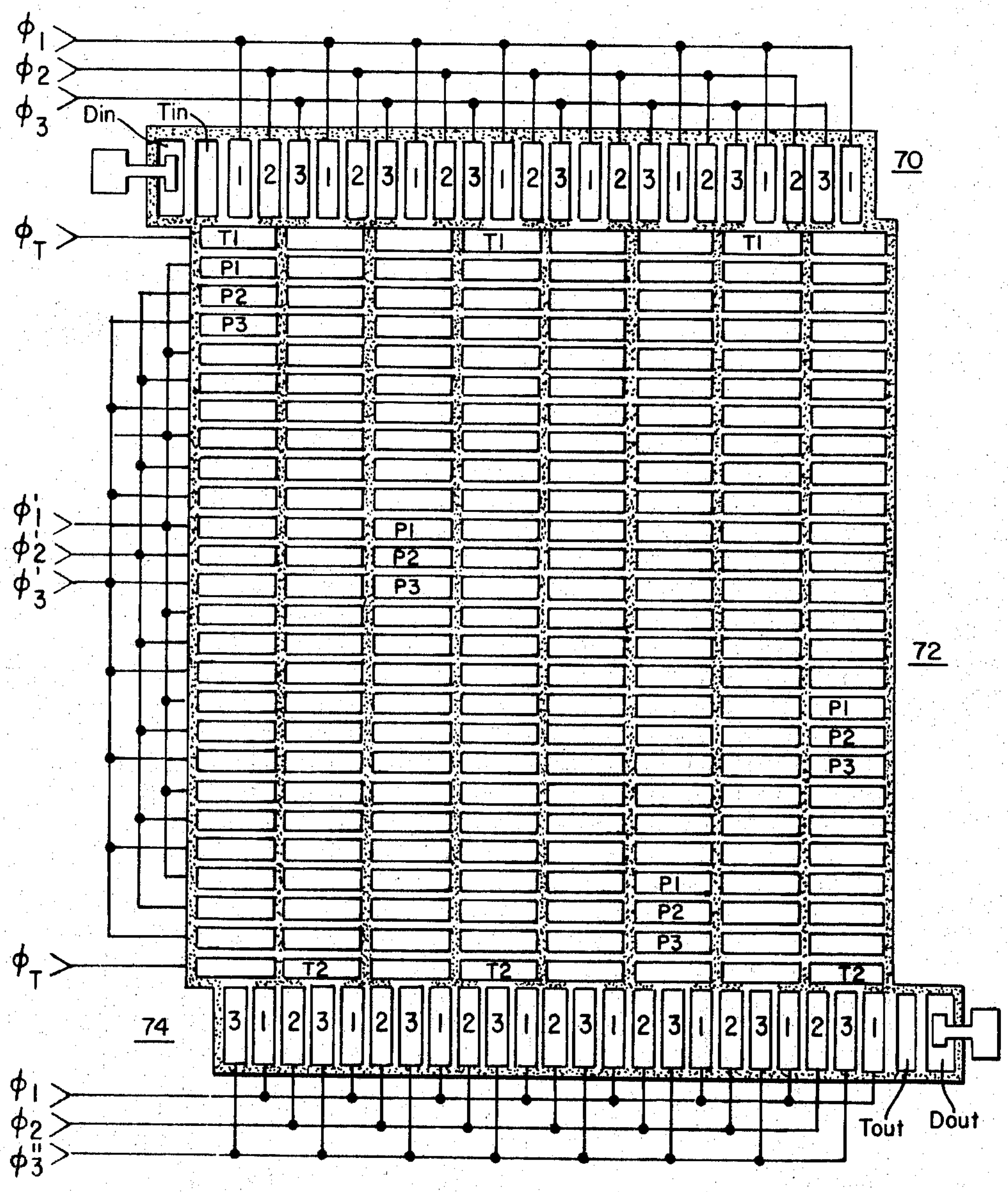
FIG. 4 is a plan view of an 8 × 8 serial-parallel-serial CCD array suitable for use in the system of FIG. 3.
Figure 5:
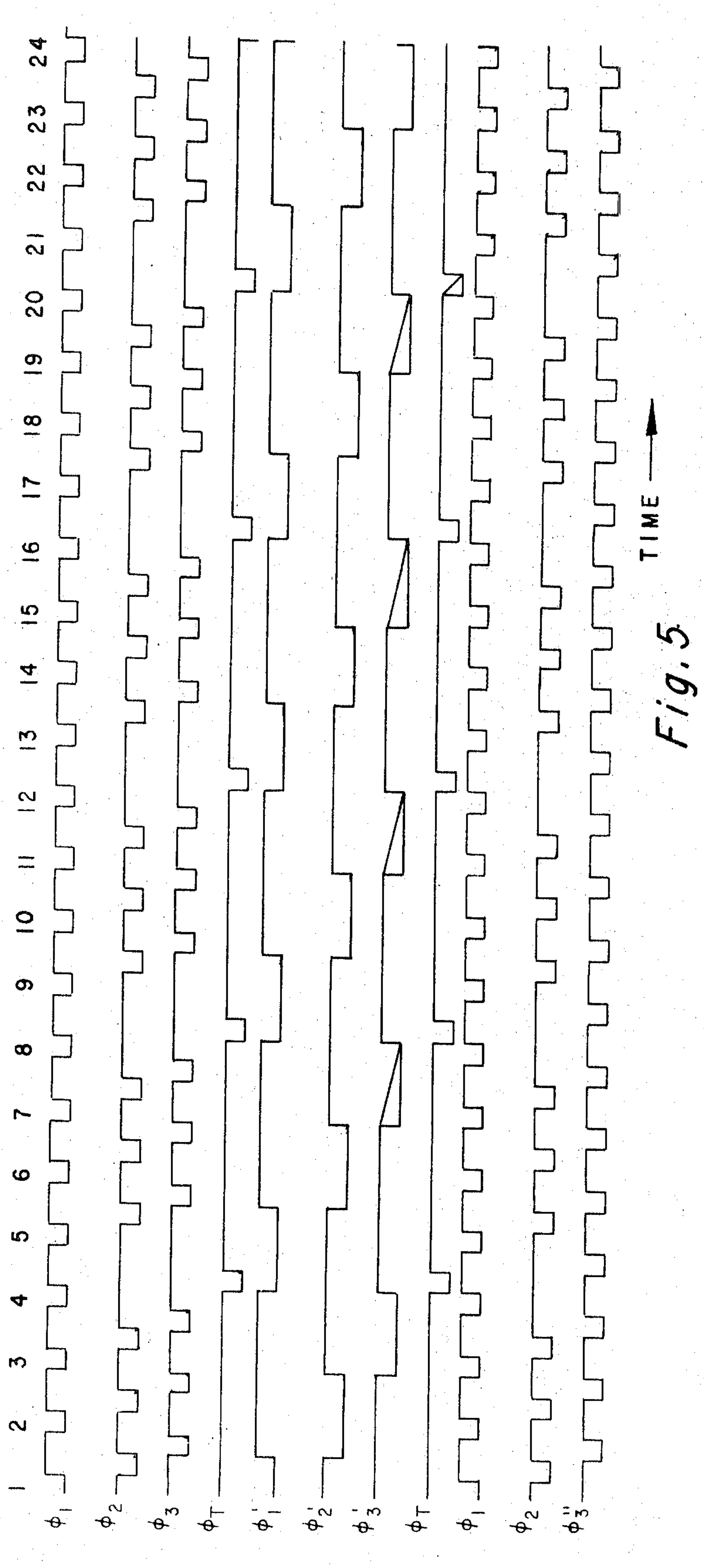
FIG. 5 is a graphic illustration of suitable clock signals for the array of FIG. 4.

More particularly in accordance with the embodiment shown generally in FIGS. 3 and 4, a serial-parallel-serial charge coupled device analog delay line or memory 62 is advantageously defined by a first section 70 which comprises a semiconductor charge device analog shift register having n bits (illustrated by way of example as an 8 bit shift register) for serially propagating analog data at a relatively fast clock rate by means of clock pulses $\phi_1$, $\phi_2$, $\phi_3$ applied to corresponding transfer electrodes 1,2, 3 as shown. The shift register 70 has an input diode D1 with associated transfer electrode T for entering data into the shift register. A second section 72 includes a plurality n of semiconductor charge device analog shift registers each including sets of transfer electrodes P1, P2, P3 as shown respectively disposed adjacent selected bits of the first shift register 70, the plurality of shift registers being clocked by clock pulses $\phi_1'$, $\phi_2'$, $\phi_3'$ as shown at a relatively low clock rate. Transfer electrodes T1, clocked by pulses $\phi_T$ are included for coupling data from respective bits of the first shift register 70 to corresponding bits of the plurality of shift registers 72, thus effecting a serial-to-parallel conversion of the analog data. A third n-bit section 74 defines a third semiconductor device analog shift register having transfer electrodes 1,2,3, clocked at a relatively fast clock rate by pulses $\phi_1$, $\phi_2$, $\phi_3''$ as shown. The third shift register is disposed such that respective bits thereof are in alignment with cooresponding bits of the second plurality of shift registers 72 in the second section. The shift register 74 has an output diode $D_{out}$ with associated transfer electrode $T_{out}$ for removing data from the shift register. Transfer electrodes T2 clocked by transfer pulses $\phi_T$ are utilized to effect a parallel-to-series conversion of the data. Channel stop regions are included in the semiconductor substrate as indicated by the stippled areas in FIG. 4. A suitable form of optically active imager 60 and TV FORMAT BUFFER 69 as described by Gilbert F. Amelio et al in IEEE Transactions on Electron Devices, Vol. ED-18, No. 11, November 1971 pp992–996, with particular reference to FIG. 7. Instead of using a 4 × 4 array for the "OPTICAL INTEGRATION SECTION" as shown in FIG. 7 of the Amelio et al article, an n × n matrix corresponding to the n bits of the shift register 70 would be used, together with a line transfer shift register 71 having n-bits. The "FRAME TRANSFER LINE" and the "FRAME AND STEP TRANSFER" clock lines would be clocked with clock pulses having a repetition rate corresponding to that of pulses $\phi_1'$, $\phi_2'$, $\phi_3'$ as shown in FIG. 5 of the present application, while the shift register 71 would be clocked with pulses having a repetition rate corresponding to that of pulses $\phi_1$, $\phi_2$, $\phi_3$ also as shown in FIG. 5 of the present application.

Information would be transferred from the "OPTICAL INTEGRATION" shown in FIG. 7 of the cited Amelio et al article, into the shift register 70 shown in FIG. 3 by the shift register 67, which would be similar to the line readout shift register (71) in the cited Amelio et al article, but disposed at the opposite end of the "OPTICAL INTEGRATION SECTION" thereof, information clocked out from the output diode of the shift register 67 being entered into shift register 70 shown in FIG. 3 of the present application, by the input diode D1.

Transfer electrodes clocked at a repetition rate corresponding to that of pulses $\phi_T$ would be included for selective transfer of data from the "OPTICAL INTEGRATION SECTION" into shift registers 67 and 71.

In operation, in the absence of an output from the integrator 66 shown in FIG. 3, the control logic 68 is actuated to apply the clock pulses to the shift registers 67, 70, 72 and 74 as described above, to reverse the sequence of pulses $\phi_1'$, $\phi_2'$, $\phi_3'$ applied to shift register 60 and to inhibit application of the clock pulses to the shift registers 69 and 71. In response to an output from the integrator 66, resulting from detection of motion in the scene to which the imager 60 is exposed, the control logic 68 is actuated temporarily to inhibit application of clock pulses to shift registers 70, 72 and 74 for a desired period of time; to restore the sequence of the pulses $\phi_1'$, $\phi_2'$, $\phi_3'$ applied to the shift register 60 and to initiate application of clock pulses to the shift register 71, thereby reading out lines of signal charge from the line readout section 71 as described in the abovecited Amelio et al article. Design of the control logic 68 to fulfill the abovedescribed functions is a matter of routine to a person having ordinary skill in the art. This serial-parallel-serial configuration of analog memory sections has the advantage of reducing the number of transfers of a bit of data as it propagates through the memory system. For example, in an n × n matrix, a bit of data propagating through the memory requires only $2n$ transfers as contrasted to $n^2$ transfers required in a comparable memory which utilizes only serial propagation. This provides an important advantage in transferring analog data since, as noted previously, a certain amount of the signal is dispersed after each transfer; i.e., the charge transfer efficiency is less than 100 percent. Another advantage provided by the serial-parallel-serial configuration is that the data propagates through the parallel section at a significantly slower clock rate than through the series section (1/n the rate of the serial section). Since the charge transfer efficiency increases as the frequency decreases there is a more efficient transfer of charge through the parallel section as contrasted to the series section.

A more detailed description of such a serial-parallel-serial charge transfer device analog memory may be found in copending application, Ser. No. 207,905, filed Dec. 14, 1971 in the name of Collins et al, and assigned to the same assignee as the present invention, which application is incorporated by reference herein.

A suitable 8 × 8 CCD serial-parallel-serial array is illustrated in FIG. 4; suitable clocks are shown in FIG. 5.

The structure of the present invention is particularly advantageous in that conventional thresholding circuitry in the detector can be utilized to provide detection of changes above base circuit levels; thus, the sensitivity can be adjusted as desired. For example, the threshold level can be adjusted such that slow changes in light used with the ambient is not detected, whereas level movement is detected. A further advantage of the invention is realized due to the higher resolution of the detector array. This enables detection of movement within the scanned area; whereas conventional moving target indicators are typically effective to detect only that movement of an object into and out from the field of view of the detector.

While the present invention has been described in detail with respect to illustrative embodiments, it will be apparent to those skilled in the art that various changes may be made without departing from the spirit or scope of the present invention.

What is claimed is:

1. In a system for detecting a change in the status of signals corresponding to a preselected monitored target, the combination comprising:

a. a plurality of first charge transfer device shift registers each comprising a plurality of optical resolution elements, said first plurality of shift registers together defining an array of resolution elements, each said resolution element effective to generate a signal corresponding to a target image area incident thereon during an integration period;

b. high impedance tap means for providing from said first shift registers a non-destructive readout of said signals corresponding to said target image in a preselected sequence;

c. charge transfer device shift register storage means for receiving said signals from said first shift register devices;

d. said first shift registers including means for receiving clock pulses for reading out signals from said first shift registers for application to said high impedance tap means and for inputting to said shift register storage means;

e. said shift register storage means including means for receiving clock pulses for synchronous inputting of signals from the first shift register means and reading out of signals from said shift register storage means, signals from said first shift register means corresponding to target-related signals generated by said resolution elements during a first integration period, and signals from said shift register storage means corresponding to target-related signals generated by said resolution elements during a second integration period previous to said first integration period; and f. signal processing means for simultaneously receiving said signals from said high impedance tap means and from said shift register storage means for providing comparison output signals on a resolution element by resolution element basis between target-related signals during said first and second integration periods.

2. A system as set forth in claim 1, including charge transfer device shift register buffer storage means responsive to said signal processing means for providing a video compatible signal corresponding to said target image whenever a difference between said target-related signals generated during said first and second integration periods is detected.

3. A system as set forth in claim 1 including transmission means responsive to said signal processing means for transmitting only those said target-related signals generated during said first integration period which differ from corresponding target-related signals generated during said second integration period.

4. A system as set forth in claim 1 wherein said first plurality of charge transfer device shift registers comprises optically active chargecoupled shift registers and said charge transfer device shift register storage means comprises optically inactive charge coupled device shift registers.

5. A system as set forth in claim 4 wherein said charge transfer device shift register storage means comprises a serial-parallel-serial configuration of charge-coupled device shift registers.

6. A delta modulation data transmission system comprising:

a. optical detector means comprising a plurality of charge transfer device shift registers each comprising a plurality of bits defining a plurality of optical resolution elements for generating a frame of video information comprising respective lines of analog signals during exposure of said array to a target image;

b. first signal readout means for providing a non-destructive readout signal from said detector means on a line-by-line basis;

c. charge transfer device shift register storage means connected to receive lines of analog signals from said optical detector shift registers and to store a plurality of said lines corresponding to one frame of video information detected by said optical detector means during an integration period;

d. second signal read-out means for providing a non-destructive readout signal from said storage shift register means on a line-by-line basis of a frame of video information detected by said optical detector means during a preceding integration period; and e. comparator means for comparing the said readout signals from said first and second signal read-out means to provide output signals for transmission only when a difference in said detected signals is indicated, thereby providing a data transmission system wherein only difference data is required to be transmitted.

7. A data transmission system as set forth in claim 6 wherein said optical detector means comprises an array of optically active charge coupled shift register devices.

8. A data transmission system as set forth in claim 7, wherein said charge transfer device shift register storage means comprises a serial-parallel-serial charge-coupled device analog delay line.

9. A moving target indicator comprising in combination:

a. an optically active charge transfer device array defining a plurality of resolution elements for generating data during a first exposure to a target;

b. first read-out means for providing a non-destructive readout of data from said optically active charge transfer device array;

c. optically inactive charge transfer device analog delay line means having input means for receiving in shift register fashion said data corresponding to said first exposure and output means for shift register read out of said data;

d. said array and said delay line means including transfer electrodes for receiving clocking signals to control transfer of data generated by said resolution elements to corresponding storage elements in said delay line;

e. second readout means for providing a non-destructive readout of data from said delay line means;

f. comparator means for receiving data from said second readout means corresponding to data generated during said first exposure, and for simultaneously receiving data from said first readout means corresponding to data generated during a second exposure of said target subsequent to said first exposure, thereby providing an output signal on a resolution element by resolution element basis corresponding to changes in said target between said first and second exposures.

10. A moving target indicator as set forth in claim 9, wherein said array comprises an array of charge-coupled shift register devices and said analog delay line comprises a serial-parallel-serial configuration of charge-coupled device shift registers.

11. A moving target indicator as set forth in claim 9 including charge transfer device buffer storage means operably responsive to output signals from said comparator means to receive signals from said detector array for providing visual display format signals of said target to a monitoring station.

* * * * *